Aug. 4, 1925.

F. A. BERG

CHILD'S VEHICLE

Filed July 26, 1924

Witnesses:

Inventor:
Frederick A. Berg
By Joshua R H Potts
His Attorney.

Aug. 4, 1925.

F. A. BERG 1,548,434

CHILD'S VEHICLE

Filed July 26 1924

Witnesses:

Inventor:
Frederick A. Berg
By Joshua R. H. Potts
His Attorney.

Patented Aug. 4, 1925.

1,548,434

UNITED STATES PATENT OFFICE.

FREDERICK A. BERG, OF CHICAGO, ILLINOIS.

CHILD'S VEHICLE.

Application filed July 26, 1924. Serial No. 728,312.

*To all whom it may concern:*

Be it known that I, FREDERICK A. BERG, a citizen of the United States, and a resident of the city of Chicago, county of Cook, and State of Illinois, have invented certain new and useful Improvements in Children's Vehicles, of which the following is a specification.

My invention relates to toys, the invention being more particularly related to a toy having the salient characteristics of a helicopter plane.

The main object of my invention is the provision of a novel toy of the character specified, constructed in simulation of a helicopter plane provided with a fuselage adapted to be occupied by a child and with superposed wings and lifting propellers, the plane being also provided with means whereby to be propelled and steered over the ground by the child.

Other objects will appear hereinafter.

The invention consists in the combinations and arrangements of parts hereinafter described and claimed.

The invention will be best understood by reference to the accompanying drawings forming a part of this specification, and in which, Fig. 1 is a top plan view of a helicopter plane made in accordance with the present invention;

Figure 1:
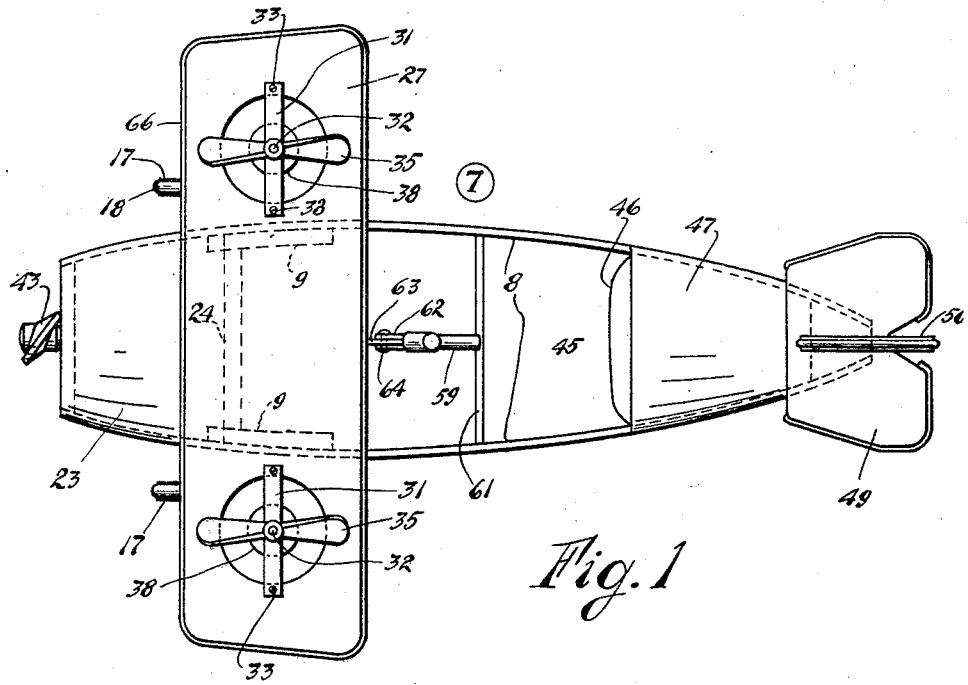

As shown in the accompanying drawings, my improved helicopter toy embodies a body 7, made as to its general outline in accordance with the conventional form of fuselage for a machine of this character. This body or fuselage consists of main complementary members 8, longitudinally and outwardly curved, as shown, in order to obtain the desired structural outline. The main members 8, such distance back of their forward ends as will allow sufficient space for a cowl, are supported on uprights 9 which extend downwardly and are made below the main members in the form of running gear struts 10 for the purpose of carrying bearings 11. Within the bearings 11 are provided antifriction devices in the form of ball bearings 12, in which turns a shaft 13 formed with cranks 14, each carrying a pedal 15. These pedals 15 are also made with ball bearings 16 to reduce friction to a minimum. On the outer ends of the shaft 13 are mounted disc wheels 17 having rubber tires 18. A square pin 19 which is passed through the shaft 13 and through suitable apertures in the adjacent disc wheel 17, on the interior of which said pin is clamped upon the disc wheel, serves as means for making one of these wheels fast with the shaft, thereby constituting a driving wheel. The opposite wheel 17 runs loose upon a shaft, to permit advantageous turning of the toy; and it is held against accidental removal by a retaining washer 20 and pin 21.

Figure 3:
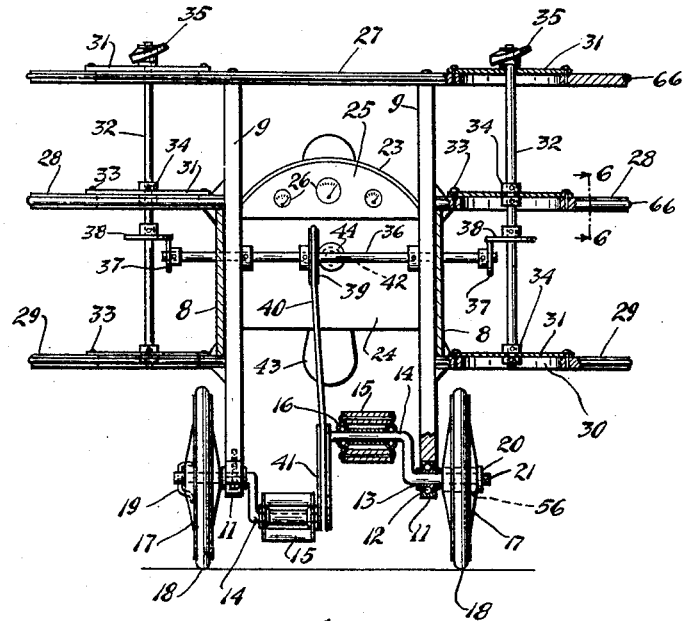
Fig. 3 is a cross section taken on the line 3—3 of Fig. 2.
Figure 4:
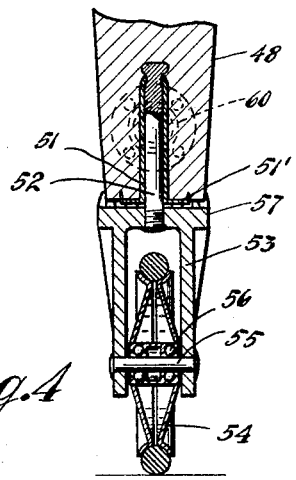
Fig. 4 is a vertical section through the steering means, taken on the line 4—4 of Fig. 2.

The main complementary members 8 are connected at their forward ends by a front panel 22 adjacent to which upon the top edges of these main members is mounted a cowl 23 upwardly curved or bowed in the form best shown in Fig. 3. The uprights 9 are braced by transverse member 24 over which the cowl has a downwardly depending portion 25 designed to serve as an instrument board on which may be printed or otherwise produced indications of instruments as 26.

Figure 2:
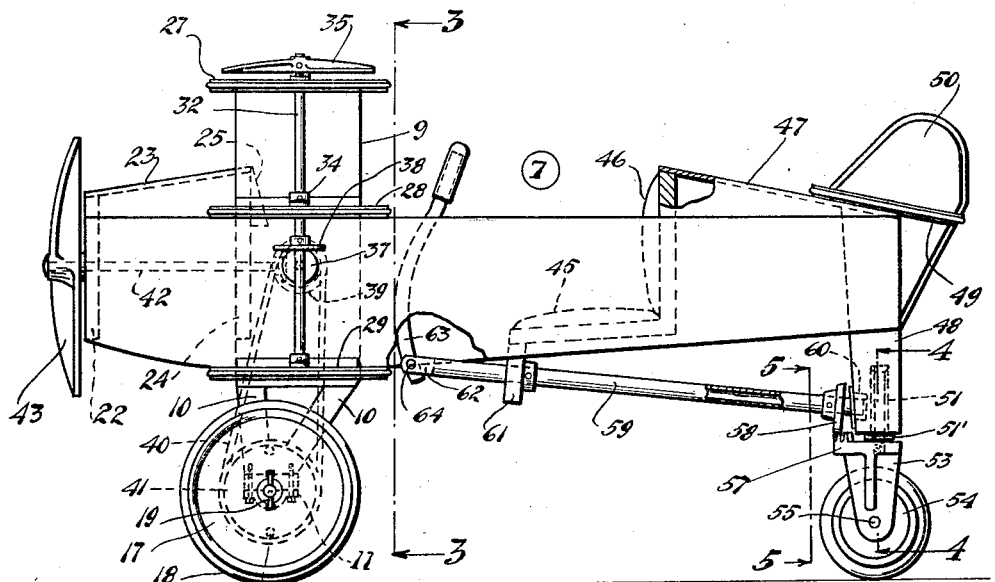
Fig. 2 is a side elevation thereof.

As clearly shown in Figs. 2 and 3 the uprights each project a distance above the main members 8 for the support of a main plane 27. Projecting from the uprights 9 at the top edges of the main members 8 are side planes 28. Projecting also from the uprights 9 at the bottom edges of the main members 8 are side planes 29. The side planes 29 and 28 and as well the top plane 27 are provided with alined openings 30, spanned diametrically by straps 31 operatively carrying vertical shafts 32. The straps 31 are secured to the planes by means of pins 33 or suitable equivalents; and to the vertical shafts above and below the straps 31 are attached collars 34. The vertical shafts 32 are thus mounted for rotation and at their top ends above the plane 27 they carry horizontal or lifting propellers 35.

Rotatably mounted in the main members 8 and uprights 9 is a horizontal shaft 36 which carries at its outer ends disc wheels 37 having frictional engagement with the faces of disc wheels 38 pinned to the vertical shafts 32. The horizontal shaft 36 also carries a pulley 39 to which motion is transmitted by a cable or belt 40 from a pulley 41 on the crank shaft 13. 42 represents another horizontal shaft which extends longitudinally of the fuselage, being mounted in the panels 22 and 24. This shaft in front of the panel 22 carries a vertical or driving propeller 43; and this shaft at its rear end carries a friction wheel 44, in position frictionally to engage the face of the pulley 39. By means of these arrangements the vertical or driving propeller 43 and the horizontal or lifting propellers 35 are spun around whenever the toy is caused to travel over the ground through the rotation of the crank shaft 13.

45 represents a seat and 46 a back rest therefor, these parts being located between the main members 8 and the back rest projecting upwardly an appreciable distance above said main members as best shown in Fig. 2. Connecting the back rest 46 with the top edges of the main members 8 is a curved top closure or turtle back 47. At their rear ends the main members 8 embrace a steering post 48 on the top of which is mounted the empennage for the toy, consisting of intersecting tail plates 49 and 50. The post 48 has a vertical bearing 51, which is formed at the lower end of the post with a circular flange 51'. Having turning fit within the bearing 51 is a pin 52 which projects upwardly from a yoke 53 between the members of which is located a rubber tired caster wheel 54 mounted on a pin or axis 55 which connects the members of the yoke as shown. For the purpose of eliminating friction the hub of the caster wheel 54 is provided with ball bearings 56; it being observed in this connection that the front wheels 17 and hubs are similarly equipped with ball bearings. The top of the yoke 53 has a portion made in the form of a segment gear 57. In mesh with the part 57 is a segment gear 58 which is carried by a steering shaft 59, the rear end of this steering shaft having turning fit in a keeper 60 provided in the post 48 while the forward portion thereof is operatively supported in a hanger 61 depending from the seat 45. The forward end of this steering shaft is yoked at 62 to receive the end of a control stick 63, pivotally mounted on a pin 64. By turning the control stick 63 to and fro, transversely of the fuselage, the toy may be steered in any direction desired since the caster wheel will be moved in accordance with the turning of the steering shaft. Being pivotally mounted in the yoke end 62 of the steering shaft, the control stick 63 is also movable towards and away from the seat 45. This provision is made in order that children of different ages or sizes may be able to sit in the seat and conveniently control the steering of the toy.

Figure 6:
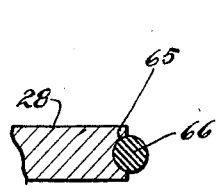
Fig. 6 shows a section through a plane, taken approximately on the line 6—6 of Fig. 3.
Figure 5:
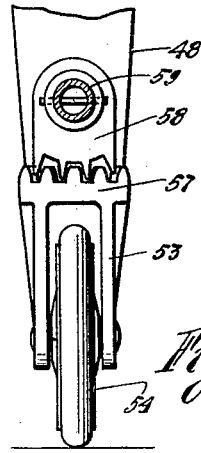
Fig. 5 shows an elevation of the swiveled wheel and connections, taken on the line 5—5 of Fig. 2.

For the purpose of protecting the household furniture and other articles from being marred or otherwise injured by the helicopter plane during its travels, the outer edges of the planes 27, 28 and 29 also of the tail blades 49 and 50 are provided with semi-circular recesses 65 (see Fig. 6) in which are secured ropes or lengths of pliable material 66, consisting of rubber, felt or other suitable material.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A child's vehicle simulating a helicopter plane comprising a fuselage having pedal operated means for propelling it over the ground, a plane construction carrying a simulation of a lifting propeller, and means for operating the lifting propeller.

2. A child's vehicle simulating a helicopter plane comprising a fuselage having pedal operated means for propelling it over the ground, superposed planes for the fuselage, horizontal propellers on one of the planes, and means for operating said horizontal propellers from the propelling means.

3. A child's vehicle simulating a helicopter plane comprising a wheeled fuselage, superposed planes, horizontal propellers on one of the planes, and pedal operated means for propelling the vehicle and driving said horizontal propellers.

4. A child's vehicle simulating a helicopter plane comprising a wheeled fuselage, propellers in simulation of lifting propellers thereon, a seat construction in the fuselage, and means comprising pedals operable by the occupant of the seat for driving said propellers.

5. A child's vehicle simulating a helicopter plane comprising a wheeled fuselage, superposed propellers in simulation of lifting propellers thereon, a seat construction, means operable from the seat for propelling the plane over the ground, and means comprising pedals for revolving the lifting propellers from said propelling means.

6. A child's vehicle simulating a helicopter plane comprising a fuselage, driving wheels supporting the front portion of the fuselage, a pedal operated axle for said wheels, superposed planes, horizontal propellers on one of the planes, and means for operating said horizontal propellers from said axle.

7. A child's vehicle simulating a helicopter plane comprising a fuselage, driving wheels supporting the front portion of the fuselage, a pedal operated axle in connection with one of the wheels, a swiveled steering wheel, planes superposed and one of them carrying horizontal propellers, means for operating the horizontal propellers from the pedal operated axle, and means for controlling the swiveled wheel.

8. A child's vehicle simulating a helicopter plane comprising a fuselage provided with a seat, wheels for the support of the fuselage including travel wheels and a caster wheel, a pedal operated axle in connection with one of the travel wheels and under the control of the occupant of the seat, means for controlling the caster wheel from the seat, superposed planes, horizontal propellers on one of the planes, and means for driving said horizontal propellers from said pedal operated axle.

9. A child's vehicle simulating a helicopter plane comprising a fuselage provided with a seat, supported planes supported in connection with the fuselage, running gear for the fuselage including a swiveled steering wheel, a rack in connection with said steering wheel, a segment gear in mesh with said rack, and means under the control of the occupant of the seat for actuating said segment gear.

10. A child's vehicle simulating a helicopter plane comprising a fuselage provided with a seat, superposed planes carried in connection with the fuselage, running gear for the fuselage including a swiveled steering wheel, a rack in connection with said steering wheel, a segment gear in mesh with said rack, and means under the control of the occupant of the seat for actuating said segment gear, said means including a shaft for the segment gear and a control stick for rocking the shaft, said control stick being pivoted for movement toward and away from said seat.

11. A child's vehicle simulating a helicopter plane comprising a fuselage having a seat, running gear for the fuselage including a wheeled axle bent to provide a gear fitted with pedals operable from said seat, superposed planes carried by the fuselage, each provided with circular openings, straps bridging said openings, a shaft operatively mounted in said straps centrally of said openings, propellers carried by said shafts, and means for operating said shafts from said wheeled axle.

12. A child's vehicle simulating a helicopter plane comprising a fuselage having a cowl and a seat, running gear for the fuselage including a wheeled axle bent to provide a crank fitted with pedals operable from said seat, superposed planes carried by the fuselage, each provided with circular openings, straps bridging said openings, a shaft operatively mounted in said straps centrally of said openings, propellers carried by said shafts, a shaft supported in advance of said cowl, a propeller on said shaft and means for operating said plane supported shafts and said cowl supported shaft from said wheeled axle.

In testimony whereof I have signed my name to this specification in the presence of two subscribing witnesses.

FREDERICK A. BERG.

Witnesses:
 FREDA C. APPLETON,
 JOSHUA R. H. POTTS.